A. MAURER AND J. J. BROSSOIT.
SPARE TIRE HOLDER.
APPLICATION FILED FEB. 25, 1919.
1,393,563.
Patented Oct. 11, 1921.
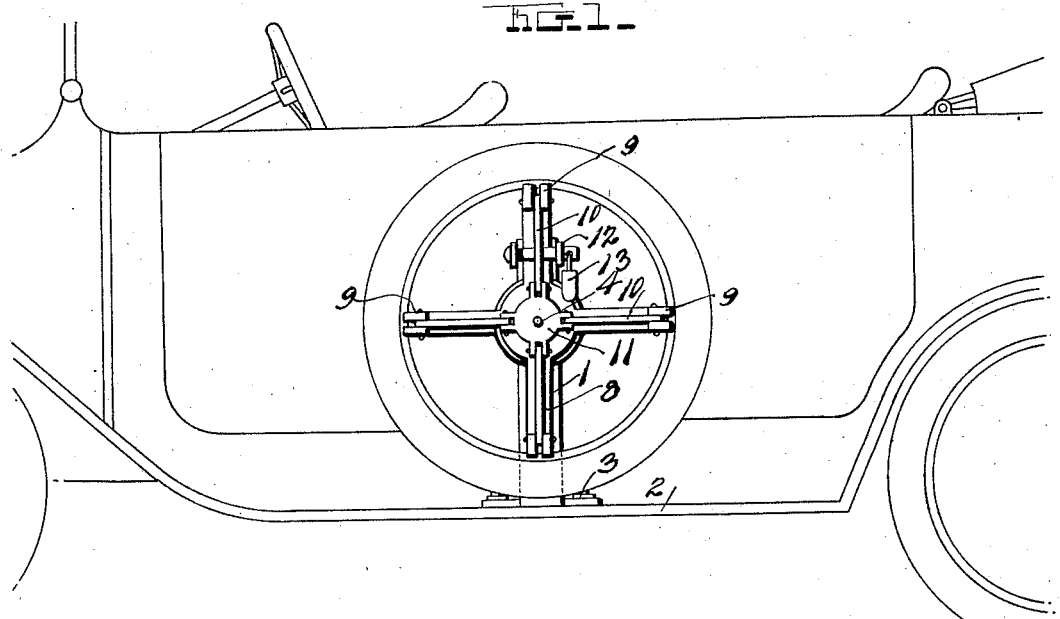
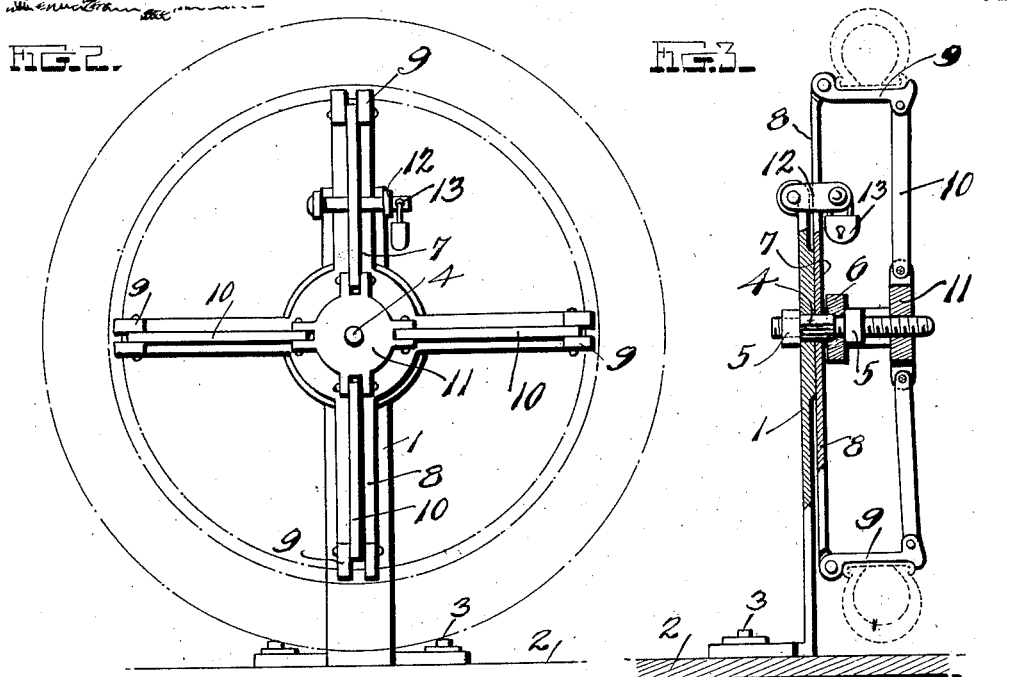
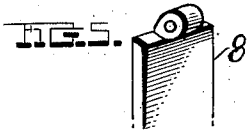
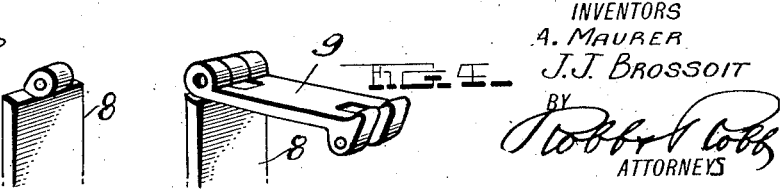
WITNESSES:
H. Woodard
INVENTORS
A. MAURER
J. J. BROSSOIT
BY
ATTORNEYS

UNITED STATES PATENT OFFICE.

ANTON MAURER AND JAMES J. BROSSOIT, OF SALT LAKE CITY, UTAH.

SPARE-TIRE HOLDER.

1,393,563.  Specification of Letters Patent.  Patented Oct. 11, 1921.

Application filed February 25, 1919. Serial No. 279,154.

*To all whom it may concern:*

Be it known that we, ANTON MAURER and JAMES J. BROSSOIT, citizens of the United States, residing at Salt Lake City, in the county of Salt Lake and State of Utah, have invented certain new and useful Improvements in Spare-Tire Holders, of which the following is a specification.

The present invention has for its object the provision of a novel device for carrying spare tires for motor vehicles.

Usually, such appliances involve more or less difficulty in securing the tire upon or removing it from the support and hence it has been our aim to so devise our invention as to facilitate these operations,—in fact to such an extent that no tools are required to accomplish the desired results.

To this end, we provide a carrier and operative connections between the same and its support such that the attachment or detachment operations are attainable incident to movement of the carrier itself.

It is further our object to provide locking means to prevent the unauthorized release and removal of the spare tire so that it will be secure against theft.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a side elevation of a motor vehicle having our invention applied to the running board of the same;

Fig. 2 is an enlarged elevation of the invention;

Fig. 3 is a vertical sectional view through the device;

Fig. 4 is a detail perspective view of the upper end of a spoke member of the carrier and its tire supporting arm; and Fig. 5 is a perspective view of the upper extremity of one of the spoke members with its tire supporting arm removed.

Throughout the following detail description and on the several figures of the drawings, similar parts are referred to by like reference characters.

While we have illustrated the invention comprehended by this application as appliable to the running board of a motor vehicle, it will be obvious that the device may be applied elsewhere without in any way affecting the novel phase or phases of the invention. Of course, its application to the vehicle will more or less involve a modification of the main support where the carrier for the tire is disposed in other positions than upon the running board.

In the embodiment disclosed, 1 designates a supporting standard secured to the running board 2 by means of fastening means 3. Mounted upon this standard is a short axle 4, adapted to be fixed against rotation in any desired manner. We preferably provide clamping elements or nuts 5, 5 arranged at opposite sides of the standard, together with an intermediate collar 6 but such means are subject to modification as may be desirable. Mounted upon the axle 4 between the clamping means referred to is the carrier 7 which is in the nature of a reel, being provided with any desired number of spoke members 8, each of which carries at its outer end a pivotally connected tire supporting arm 9, these arms being also connected by means of links 10 to a traveling member or nut 11 disposed upon the outer threaded extremity of the axle 4. We prefer to so shape the outer surface of the arms 9 that they will most readily retain a spare tire which is shown in applied positions in Figs. 2 and 3, in dotted lines. Usually the tire is mounted upon a spare rim and in this description the term "spare tire" is intended to comprehend such an arrangement.

The carrier 7 is revolubly mounted upon its axis, though sufficient friction may be produced by the clamping nuts 5 to hold the carrier or reel against rotation. To lock the carrier we provide a locking device swingingly mounted upon the upper extremity of the standard 1, the same consisting of side members 12 pivotally connected to said standard so as to swing over into the position shown in Fig. 3 to engage at opposite sides of a spoke member 8 of the carrier. Any suitable locking device is then employed to connect the ends of the side members 12 as indicated at 13, thus preventing the movement of the reel and the removal of the spare tire as will be obvious from the following description.

In the use of the invention the spare tire is disposed upon the tire supporting arms 9, and with the locking device swung into inoperative position, the reel or carrier is then revolved in one direction, causing the nut 11 to move outwardly on the axle 4.

Such movement will tend to shift the carrier arms 9 outwardly with respect to the axis of the reel and thereby positively engage them with the spare tire. In other words, such movement constitutes an expansion of the tire supporting instrumentalities, whereas rotation of the carrier in the opposite direction, followed by movement of the nut 11 inwardly on the axle, will produce a contraction of the tire supporting means and permit removal of the spare tire, provided the locking instrumentalities are not engaged with the carrier in the manner above referred to.

It will thus be seen that in order to attach or remove a spare tire from the support constructed as above described it requires merely the rotation or bodily movement of the tire carrier and this may be very quickly done, without the use of special tools, all of which is important from the standpoint of convenience.

Obviously modifications may be made in the details of construction of this device without departing from the spirit of the invention and within the scope of the appended claims.

Having thus described our invention, what we claim as new is:

1. A spare tire carrier for vehicles, including a tire carrying frame mounted to be bodily rotated, tire engaging elements thereon, and means actuated by the bodily rotation of the tire carrying frame to move the tire engaging elements into operative position.

2. In a tire holding device of the class described, the combination with a support, of a tire carrier revolubly mounted thereupon having means to cause said carrier to expand or contract upon bodily rotation of the carrier.

3. In a tire holding device of the class described, the combination of a standard, a tire carrier revolubly mounted on the standard, tire supporting arms carried by said carrier, and means movable longitudinally of the axis of the carrier when the latter is bodily revolved and connected with the arms aforesaid whereby to produce tire engaging or disengaging actions.

4. In a tire holding device of the class described, the combination of a supporting standard, a tire carrier, an axle for said carrier mounted on the standard, tire supporting arms on said carrier, a nut mounted to travel along said axle, and means connecting the arms with the nut to move said arms, for securing on or removing a tire from the carrier when the latter is bodily revolved about the axle.

5. In a tire holding device of the class described, the combination of a standard, a tire carrier mounted thereupon and comprising spoke members, tire engaging arms pivoted to the spoke members, and a traveling member to which said arms are connected movable axially of the carrier when the carrier is bodily revolved on the standard to thereby move the arms outwardly or inwardly with respect to the carrier axis.

6. In a tire holding device of the class described, the combination of a standard, a tire carrier revolubly mounted thereon, and comprising spoke members, tire engaging arms pivoted to the spoke members, links connected at one end to said tire engaging means, a nut to which said links are connected at their other ends, and an axle for said carrier upon which the nut is mounted for movement longitudinally therealong whereby to move the arms outwardly and inwardly with respect to the carrier axis.

7. In a tire holding device of the class described, the combination with a support, of a tire carrier revolubly mounted thereupon having means to cause said carrier to expand or contract upon rotation of the carrier, and locking means engageable with the carrier to prevent rotation thereof.

8. In a tire holding device of the class described, the combination with a supporting standard, a carrier reel revolubly mounted upon said standard, and a locking device pivotally mounted upon the standard to swing into engagement with the carrier to prevent movement of said carrier about its axis, and locking means to lock the carrier engageable with the locking device aforesaid.

9. A spare tire carrier for vehicles, including a tire carrying reel mounted to be bodily rotated, expansible and contractable tire engaging elements at the periphery of the reel, and means actuated by bodily rotation of the reel to move the tire engaging elements into and out of operative position.

In testimony whereof we affix our signatures.

ANTON MAURER.
JAMES J. BROSSOIT.